United States Patent

[11] 3,544,713

[72] Inventors Bernard Case
Tarzana;
Wilfried H. Hell, Woodland Hills, California

[21] Appl. No. 756,912
[22] Filed Sept. 3, 1968
[45] Patented Dec. 1, 1970
[73] Assignee The Marquardt Corporation
Van Nuys, California
a corporation of Delaware

[54] SOLID STATE ELECTRO-OPTICAL CONTACT SCANNER
27 Claims, 11 Drawing Figs.

[52] U.S. Cl. 178/7.1; 250/211
[51] Int. Cl. H04n 3/12
[50] Field of Search 178/7.1, 7.6; 250/219(Ide), 219(Idd), 211, 213, 227, 199; 338/15, 17, 18, 19, 252, 253

[56] References Cited

UNITED STATES PATENTS

| | | | |
|---|---|---|---|
| 3,011,089 | 11/1961 | Reynolds | 178/7.2 |
| 3,202,824 | 8/1965 | Yando | 250/219(IDC)UX |
| 3,470,375 | 9/1969 | Chang | 250/199 |
| 3,488,508 | 1/1970 | Weimer | 250/211(J)UX |

*Primary Examiner*—Richard Murray
*Assistant Examiner*—Alfred H. Eddleman
*Attorney*—Robert E. Geauque

ABSTRACT: The solid state scanner can be employed in a number of optical transducing applications, such as facsimile scanning, optical character reading, photographic scanning, etc. It has a contact sensing head comprised of a plurality of sensing elements, each comprising a partially transparent photoconductor. The photoconductors can be placed closely adjacent to the images to be read and a light is transmitted through the photoconductors towards the image. The amount of light reflected from the image to each of the sensing elements is obtained by electronically scanning the elements and comparing their output with a reference element which views a white portion of the same type of paper on which the image is printed. Contact with the photoconductors can be obtained from conductors located on opposite edges of the sensing element or with transparent conductors covering the two surfaces of the photoconductor elements.

Fig. 1
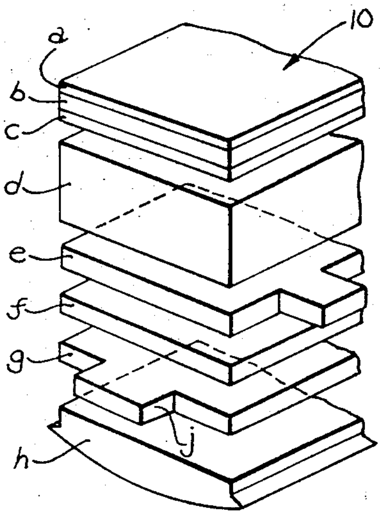
Fig. 4
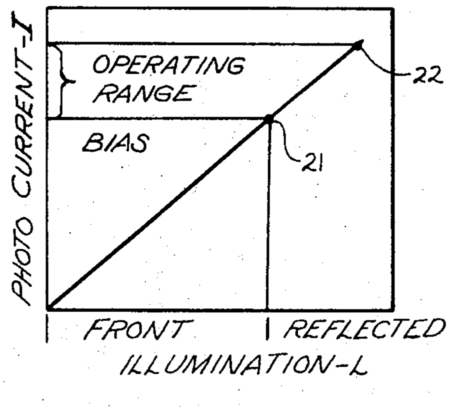
Fig. 2, Fig. 3, Fig. 5
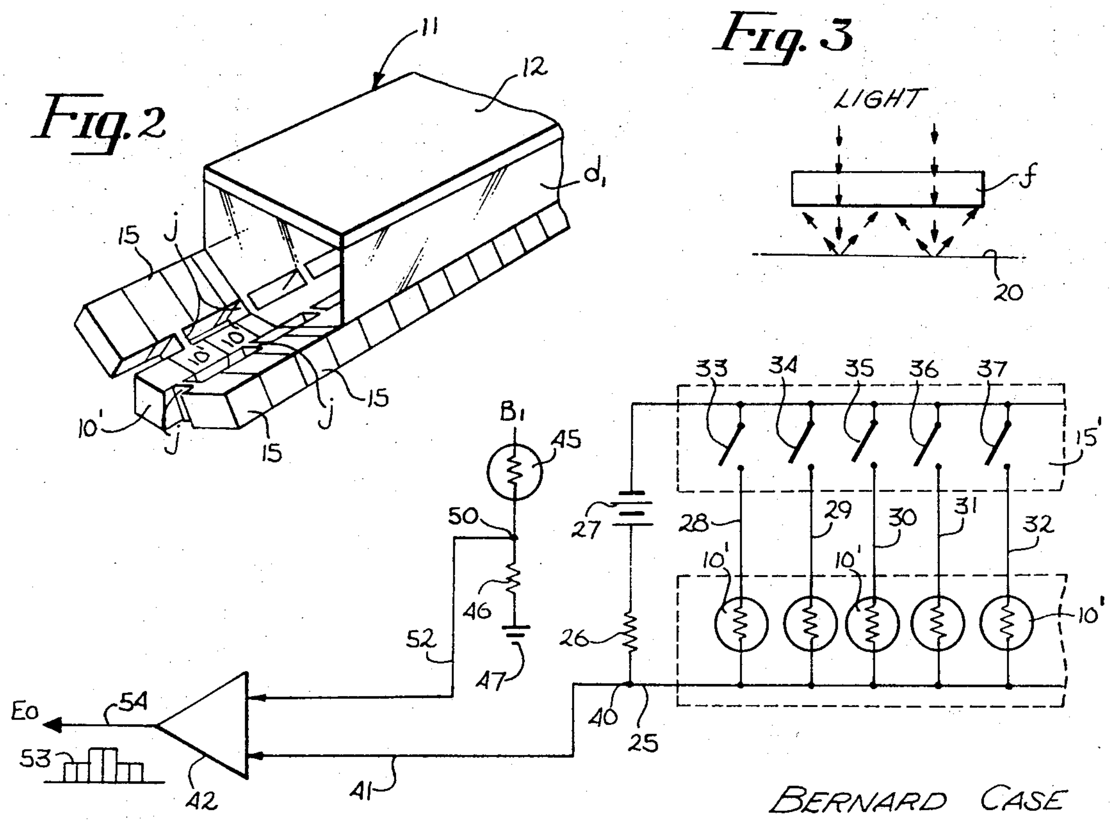
Fig. 5
BERNARD CASE
WILFRIED H. HELL
INVENTOR.
BY R. E. Geauque
ATTORNEY

BERNARD CASE
WILFRIED H. HELL
INVENTOR.

BY R. E. [signature]
ATTORNEY

BERNARD CASE
WILFRIED H. HELL
INVENTOR.

BY R. E. Geauque
ATTORNEY

BERNARD CASE
WILFRIED H. HELL
INVENTOR.

BY R. E. Grangue
ATTORNEY

SOLID STATE ELECTRO-OPTICAL CONTACT SCANNER

BACKGROUND OF THE INVENTION

This invention relates to a solid state electro-optical scanner and more particularly to a scanner having a contact sensing head for the transducing of written, typed, printed or photographic data by optical techniques. Present scanners are relatively large and heavy due to the optical projection system they employ and their performance is limited to the mechanical sweep mechanisms utilized.

At present, various complex types of optical scanners are utilized for facsimile transmission of printed words and pictures and the illuminated material is optically projected onto a single sensing element and movement of the sensing device in two directions is required.

SUMMARY OF THE INVENTION

The present invention utilizes a contact sensing head having a plurality of partially light transparent photoconductors which can operate in direct contact with or closely adjacent to the printed page. Illumination is provided by a light source which can consist of an electroluminescent film which is located on the back side of the photoconductors. In operation, the incident light passes through the photoconductors and is reflected off the page surface. The reflected light will pass through the photoconductors a second time increasing the photoconductor current a corresponding amount. Since the amount of light reflected from the page surface is a function of its data density level, photoconductor current can be monitored to sense the data contained on the page. In order to compensate for different types of paper and variations in the intensity of the light source, the signals from the sensing head can be subtracted from a reference signal established by a similar photoconductor element viewing a white area of the same type of paper.

When employed as a scanner for optical character reading, the sensing head contains a large number of sensing elements arranged in a matrix which dissect a character image into a number of parts, and by sensing the light level at each part over the scanned area, a plurality of signals are produced which are compared with stored character patterns in order to provide a binary output which is representative of the characters. Facsimile scanning can be accomplished by a single, horizontal row of sensing elements across the page which are scanned sequentially and the paper is then moved vertically to the next scan area. Also, a mosaic array of elements of sufficient size can be utilized to encompass a complete line of characters and the page is moved from line to line. Also sufficient sensing elements could be utilized to cover the whole page and all of the sensing elements could be electrically scanned to reproduce the page in which case no mechanical motion would be required during the reading operation.

It is therefore an object of the present invention to provide a solid state scanner having a contact sensing head utilizing a plurality of sensing elements consisting of partially transparent photoconductors which can be located in direct contact with or closely adjacent to a printed page, and energized by a light passing through the photoconductors and reflected from the printed page, the reflected light passing through the photoconductors a second time.

Another object of the present invention is to provide a scanner having a contact sensing head for reading printed pages, the scanner being closely positioned adjacent the printed page and requiring movement only of the page while the head remains stationary.

Another object of the invention is to provide a solid state scanner having a contact reading head utilizing partially transparent photoconductors which can sense material on an opaque printed page without the use of any lenses.

A further object of the invention is to provide a sensing element for an optical character reader which utilizes a partially transparent photoconductor through which light is passed and reflected back through the photoconductor.

These and other objects of the invention not specifically set forth above will become readily apparent from the accompanying description and drawings.

BRIEF DESCRIPTION OF THE DRAWINGS

FIG. 1 is an enlarged, expanded perspective view of one configuration of a sensing element of the sensing head;

FIG. 2 is a perspective view partially in section of a plurality of sensing elements incorporated into a single line-scanner sensing head;

FIG. 3 is a schematic illustration of the transmission of incident light through a partially transparent photoconductor and the back-reflection of the light through the photoconductor from the printed page;

FIG. 4 is a graphic illustration of the photocurrent characters of the photoconductors;

FIG. 5 is a schematic illustration of a single row of sensing elements which can be placed across a page to provide a single line scan;

DESCRIPTION OF THE SHOWN EMBODIMENT

Figure 6:
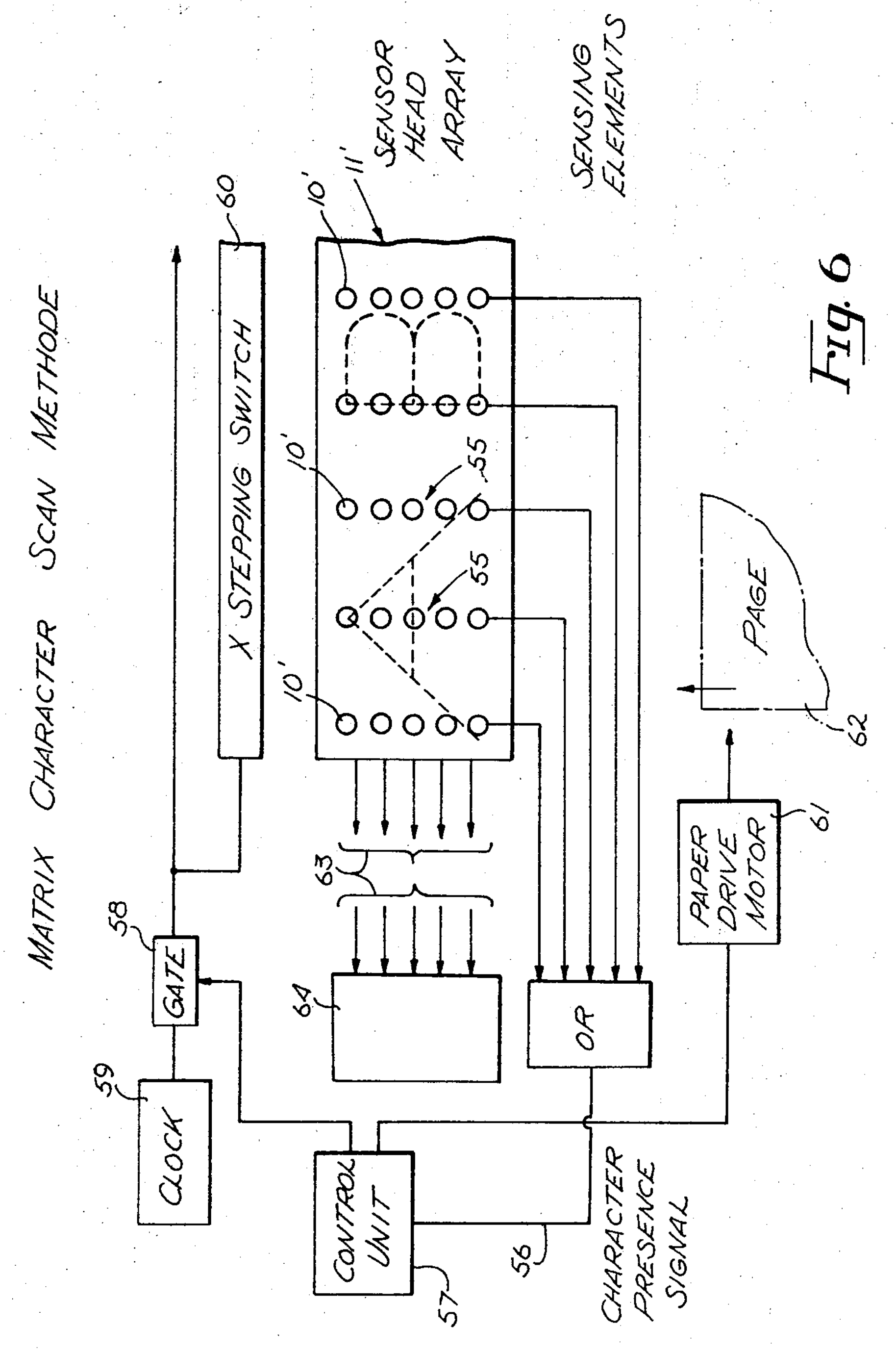
FIG. 6 is a schematic illustration of a mosaic array of sensing elements to encompass a complete line of characters.

Referring to the embodiment of the invention chosen for illustration, an enlarged portion of a sensor element 10 is illustrated in FIG. 1 and consists of a conductor *a* located on one side of electroluminescent material *b* and a transparent conductor *c* on the other side of the electroluminescent material. A layer *d* of transparent glass is adjacent layer *c* and adjacent to layer *d* is a transparent conductor *e* also adjacent one side of a partially transparent photoconductor *f*. Another transparent conductor layer *g* is located on the other side of photoconductor *f* and on the other side of layer *g* is a layer of glass *h*. Several of these various layers can be deposited by thin film deposition techniques in order to produce very small compact sensing elements from the solid state materials.

When the conductors *a* and *c* are energized, the electroluminescent light source *b* produces light which passes through glass layer *d* and through the conductors *e* and *g* and through the photoconductor *f* and glass layer *h* and onto the page which is being scanned. The transparent conductors *c*, *e* and *g* can be fabricated of indium trioxide, the photoconductor *f* can be fabricated of copper-doped cadmium sulfide, and the electroluminescent material *b* can be fabricated of zinc sulfide.

A sensing head 11 illustrated in FIG. 2 has a plurality of individual sensing elements 10' located side by side and each element comprises layers *e* through *h* described in FIG. 1. All of the sensing elements 10' have a common glass layer $d_1$ and a common illumination source 12 comprised of layer *a*, *b*, and *c* described in FIG. 1. One readout commutator element 15 is associated with each sensing element 10' and communicates with the sensing element through the conductors *j*, which lead from conductors *e* and *g*. The commutator 15 for adjacent elements are shown alternately on opposite sides of the element. If desired, the size of the commutators can be reduced so that both conductors *e* and *g* communicate with commutators 15 on one side only of the elements 10'. An alternative construction of a sensing element can utilize the partially transparent photoconductor *f* but the two transparent conductors *e* and *g* are replaced by two chromium vapor deposited electrodes located at opposite sides of the photoconductor layer *f* of each element. A common bus bar can be used for all of the electrodes on one side of the sensing elements and individual output electrodes can connect to the opposite sides of the photoconductor elements.

As illustrated in FIG. 3, the light from the source 12 passes through the photoconductor *f* and is reflected off the surface of page 20. Thus, the reflected light passes through the photoconductor *f* a second time, thereby increasing the photoconductor current a corresponding amount. The amount of light reflected from the page surface will be a function of its data density level and the photoconductor current can be monitored to sense the data on the printed page.

As illustrated in FIG. 4, the photoconductor current resulting from the front illumination is illustrated by the point 21 and the increased current resulting from the reflection from the surface of page 20 is illustrated at point 22. Since the amount of incident light passing through the photoconductor remains constant, the operating range of the photoconductor due to the back-reflected light is between the points 21 and 22.

In operation, the signal from the sensing elements is conditioned by a reference signal established by a similar photoconductor sensing element viewing a white area of the same type of paper located at another location away from the page. In this way, a sensing element 10' would produce no output when interrogating white portions of the page and would produce an output signal from those areas where printed material is present.

Referring to FIG. 5, a single row of sensing elements 10' are located side by side, and one side of each element is connected to a lead 25 which contains a load resistor 26 and a voltage supply 27. The other side of the sensing elements 10' are connected through lines 28, 29, 30, 31 and 32 to the negative side of the voltage supply 27 through switches 33, 34, 35, 36 and 37, respectively, of a commutator 15'. When the commutator switches 33—37 are closed sequentially, the sensing elements 10' are sequentially connected to the supply voltage 27. The amount of illumination on each of the sensing elements 10' will determine the current flow through its connection with the supply voltage 27 and will determine the voltage at point 40 in line 25. The voltage at point 40 is connected to a differential amplifier 42. The reference sensing element 45 is connected between voltage supply $B_1$ and ground 47 through a load resistor 46. The potential at point 50 between the reference sensing element 45 and the load resistor 46 is connected by line 52 to the amplifier 42. The signal in line 41 is modified by the signal in line 52 to produce an output $E_o$ in line 54 as illustrated by the voltage plot 53. When a sensing element 10' is looking at paper without printing, its illumination is greatest and therefore its conduction is highest, which reflects the highest voltage at point 40. The voltage at point 40 will reduce in accordance with the amount of reduced reflection to the sensing element resulting from printed matter at the location at which the sensing element is looking. The voltage at point 50 remains constant because the reference sensing element 45 looks at white, unprinted portions of the page and the ratio in the two voltages at lines 41 and 52 produce the voltage output $E_o$. This comparative method of operation produces a large black and white signal ratio and automatically compensates for variation in the reflectance of different types of paper and for fluctuations in the intensity of the incident light. It is understood that the output curve 53 represents a condition in which the switches are sequentially closed at the intervals represented by the vertical lines and that the switches are only a schematic illustration of the commutator action. The single horizontal row of sensing elements 10' in FIG. 5 function as a single line scan across the page. The line of sensing elements can be electronically scanned by the commutator as the page is moved over the read head.

In FIG. 6, a matrix sensing head 11' is shown which reads a complete character line which is positioned under the sensing head, and intermittent page motion is utilized wherein the page is shifted from line to line. This type of readout is designated as matrix character scan as distinguished from the single line scan illustrated in FIG. 5. The sensing elements 10' are located in the sensing head with 50 (or more) sensing elements 10' located in separate vertical columns 55 spaced apart horizontally across the page (only five elements being shown). The height of each line is sufficient to encompass and overlap the height of a character on the page, such as A and B illustrated in dashed lines. The bottom row of sensing elements is utilized to locate the bottom of each line of characters and to produce a character presence signal in line 56 leading to control unit 57. When a line of characters is present under the read head, the control unit 57 opens a gate 58 to permit the signal from the clock 59 to operate the commutator 60 corresponding in function to commutator 15'. Also the control unit 57 operates the drive motor 61 which moves the page 62 after each row of characters is scanned. After a line of characters is positioned under the sensing head array, the page is then stopped and character read out is performed by reading out columns of sensing elements 10' one at a time proceeding from left to right. The characters A and B are illuminated and sufficient sensing elements are present in order to distinguish the various characters from one to another. The output signals 63 from the sensing elements 10' can be compared with stored arrays in unit 64 in order to determine the identity of the characters.

Figure 7:
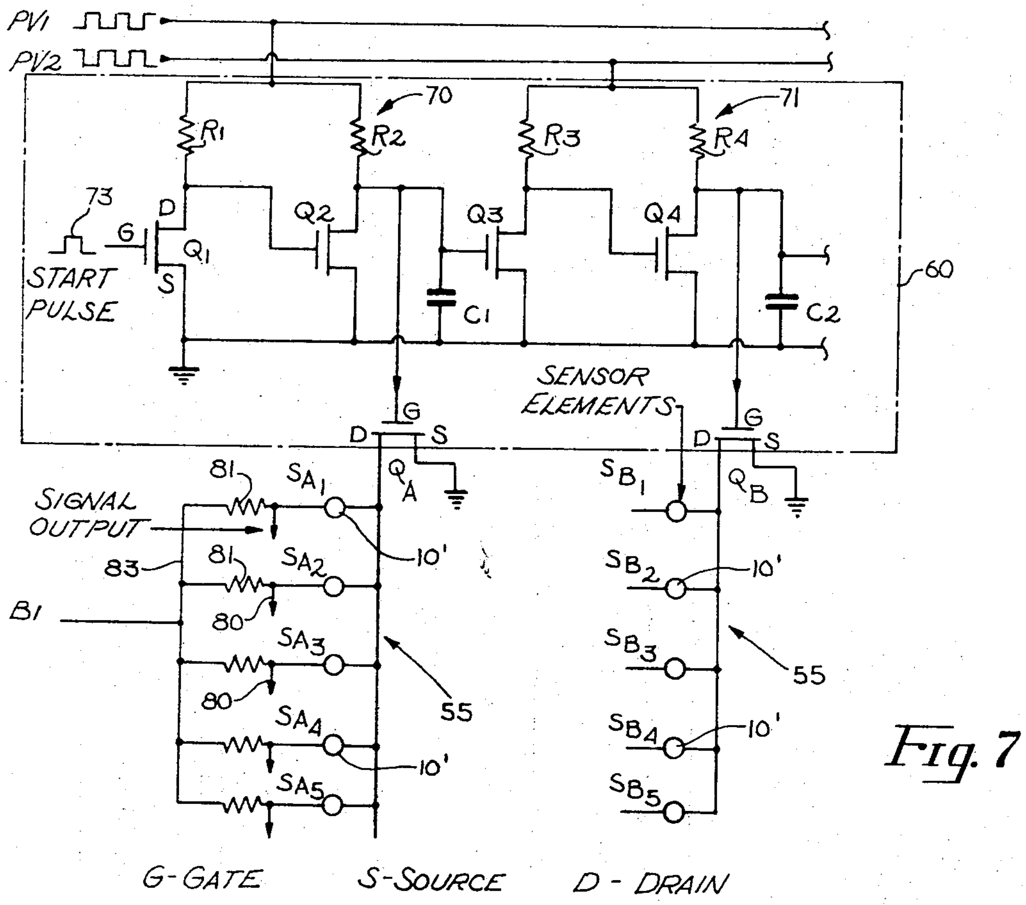
FIG. 7 is a schematic illustration of an electric commutator for the mosaic array of sensing elements of FIG. 6.

Referring to FIG. 7, the commutator 60 is shown schematically and the synchronizing signal from clock 59 comprises two drain voltages $PV_1$ and $PV_2$ with a phase difference of 180°. The commutator circuit comprises a plurality of stages (each stage containing two triodes) and the two-phase clock input $PV_1$ and $PV_2$ varies the output pulse from stage-to-stage, such as from detector stage 70 to detector stage 71. Adjustment of the capacitors $C_1$, $C_2$, etc. between each stage permits the frequency to be varied over a wide range, such as between one c.p.s. and one megacycle per second. In operating, a positive start pulse 73 is applied to the gate of the first triode $Q_1$. A positive pulse at the gate of the triode causes that unit to conduct heavily (high current amplification) decreasing the output voltage at the drain electrode towards the source potential. Thus, Q is highly conducting and the voltage applied to $Q_2$ is essentially zero volts. $Q_2$ is therefore cut off and the drain current through $R_2$ charges capacitor $C_1$ during the period in which the start pulse and drain voltage are "on". The output of $Q_2$, besides charging capacitor $C_1$, is also connected to the gate of the switching triode $Q_A$. This latter triode, when activated completes the ground circuit of the first sensor column 55, causing the parallel transfer of the data in that sensor column. In order to sequence the commutator 60 to the second sensor column, two drain voltage signals with a 180° phase difference are provided. Thus, the drain voltage is applied first to all odd numbered detector stages and then to all even number stages. Removing voltage from the drains of $Q_1$ and $Q_2$, removes voltage from the first detector stage. In turn, drain voltage is then applied to $Q_3$ and $Q_4$ and the sequence is repeated due to charge stored on $C_1$ during the previous cycle which applies a positive potential to the gate of $Q_3$. Read out voltage is thereby applied to the second detector stage. It is therefore apparent that the sensing element 10' of each vertical column are energized sequentially by the switching triodes $Q_A$ and $Q_B$, etc. to produce sequential read outs from the sequentially vertical columns of sensing elements until a line is scanned across the page.

Figure 8:
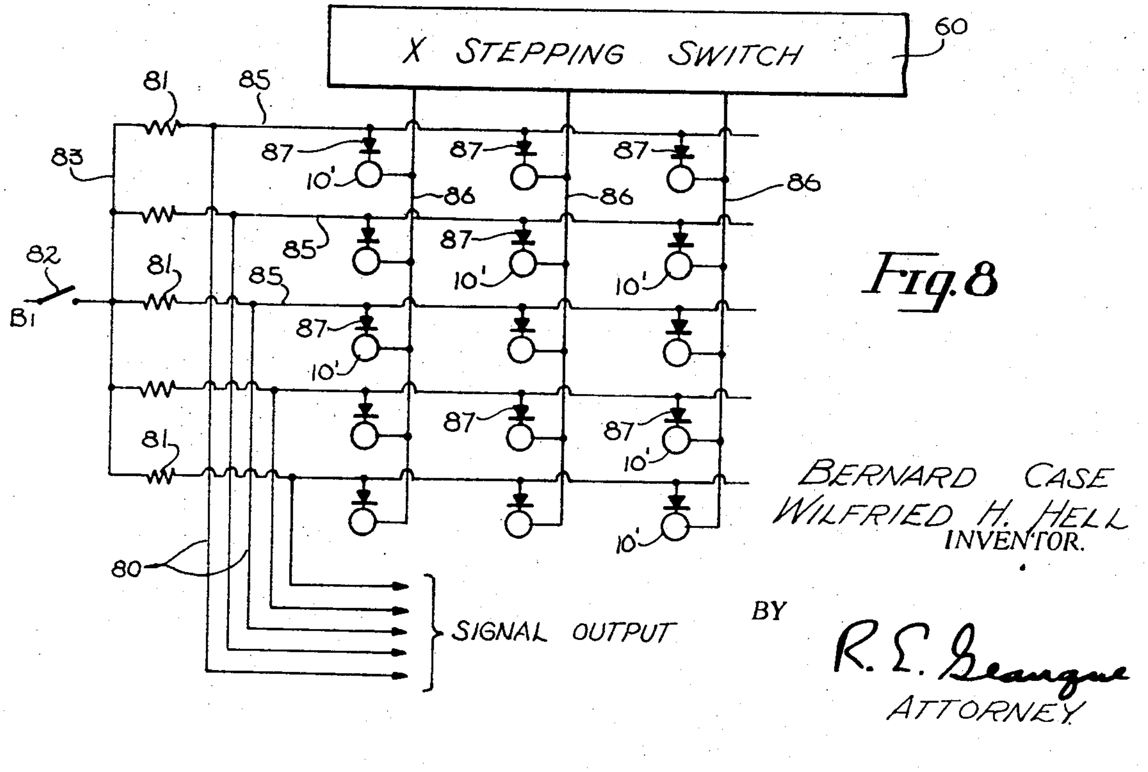
FIG. 8 is a readout circuit for a mosaic array of sensing elements such as shown in FIG. 6 utilizing a single load resistor for each line of elements.

Referring to FIG. 8, the signal output lines 80 for all vertical columns of sensing elements 10' are connected to lines 85 extending between the sensing elements of the first column and load resistors 81. A power source $B_1$ is selectively connected through a switch 82 and line 83 to all of the load resistors and the commutator 60 sequentially completes a ground path for each vertical column, going sequentially from left to right. A diode 87 is located between each sensing element on its output line 85. The diodes 87 prevent cross talk from sensing elements in other columns during read out from one column and thus, the commutator matrix permits the use of a single load resistor 81 to read successively the outputs of sensing elements in a different vertical column.

Any suitable device can be used for moving the page under the sensing head and various other types of commutator circuits can be utilized. It has been determined that a photoconductor transmissivity of 40 to 50 percent produces a maximum difference in photoconductor current when sensing a photo black and white page area. In actual practice, the sensing elements 10' are very small, and 100 to 200 elements to the inch up to 1,000 elements per inch can be utilized.

Figures 9, 10, 11:
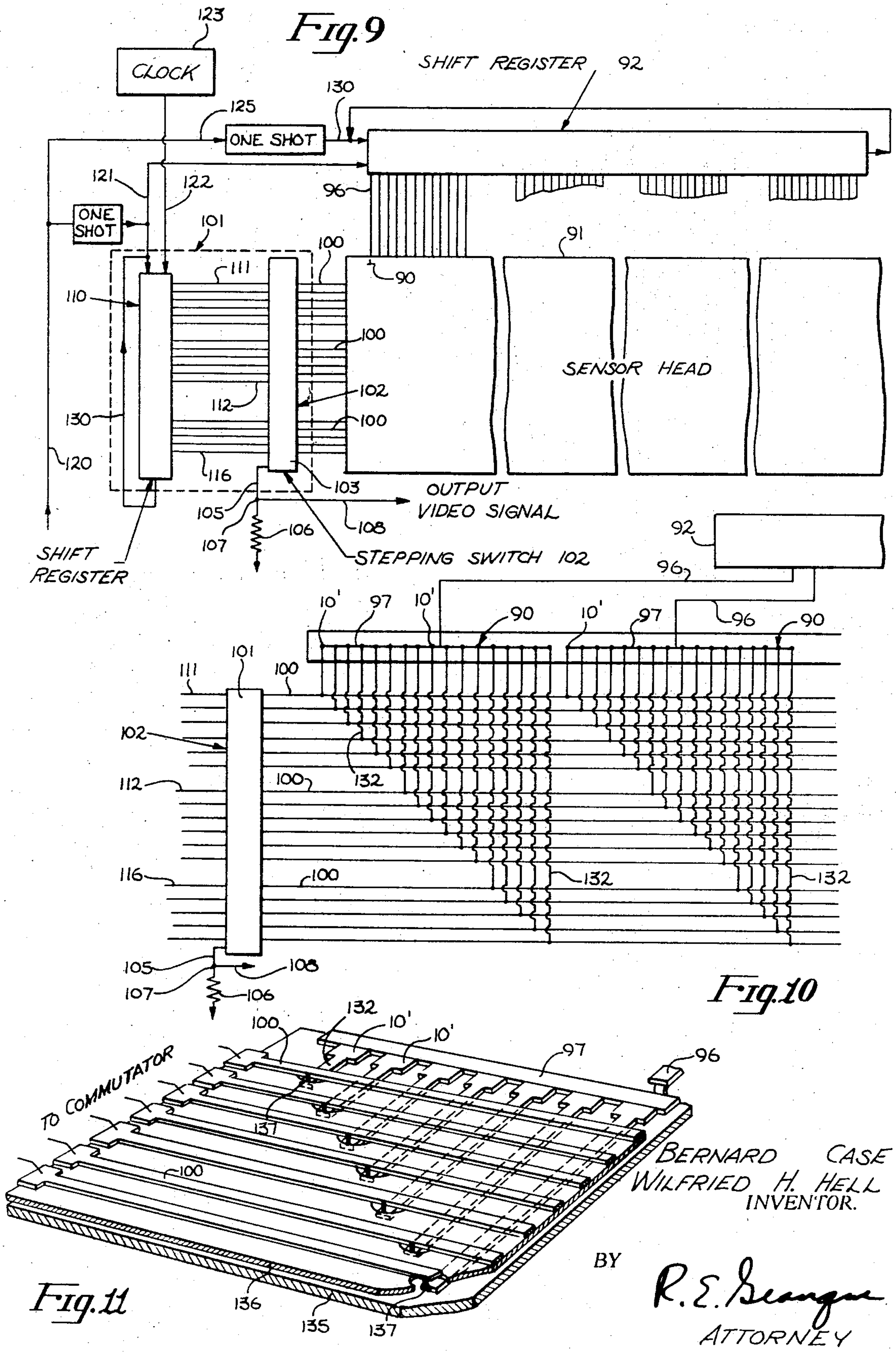
FIG. 9 is a schematic illustration of a segmentation system for simplifying the readout from a single line of sensing elements.
FIG. 10 is an enlargement section of the schematic illustration of FIG. 9.
FIG. 11 is a perspective view showing a thin film construction for connecting the commutator units to the sensor elements of FIG. 10.

A commutator circuit for producing the single line scan (discussed in connection with FIG. 5) is illustrated in FIGS. 9, 10 and 11. The system comprises a plurality of groups 90 of sensor elements 10' located in a sensor head 91 in a straight line so that all the group can extend over a line on a paper which is to be scanned. Each group of elements 90 is connected together by line 97 which in turn is connected by a line 96 to an output line of the shift register 92. In this example (FIG. 9) 17 separate sensor elements 10' are in each group and are connected by individual lines 100 to the multiplexer 101. Each switch of the stepper switch 102 of the multiplexer connects in sequence each line 100 to line 105 containing a common load resistor 106. The voltage at point 107 is taken off by line 108 to provide the output video signal. A 17 step shift register 110 operates the stepping switch 102. In operation, each line 96 in sequence provides a voltage to bar 97, which connects together a group of sensor elements. The group of elements are then sampled by the stepping switch 102 with which they are connected by 17 lines 100.

The shift registers 92 and 110 are started by a start (data input) pulse in line 120 which is imparted to the multiplexer shift register 110 through line 121 and to shift register 92 through line 130. The register 110 is also connected to a clock 123 through line 122. In operation, the data input pulse energizes the bar 97 for the first group 90 of sensor elements. The clock pulse causes the shift register 110 to shift progressively along lines 111 to cause stepping switch 102 to sequentially connect the 17 lines 100 to output 108. At the end of the operation of shift register 110, a pulse in line 130 is recirculated back into register 110 and also is directed to the shift register 92 to energize the next group of elements 90 for read out in a similar manner. It is understood that any number of sensing elements can be included within a group 90 and that the 17 elements discussed herein were selected only as an example. Also, when the scan of one line is complete, the groups of elements are moved to the next line.

Two groups 90 of sensor elements are illustrated as greatly enlarged in FIG. 10 and the sensor elements 10' of each group are shown connected together by the common bar electrode 97. Each of the sensing elements is connected separately to one of the lines 100 by a separate line 132. FIG. 11 is a perspective illustration of a physical construction of the sensor head to perform the functions of the circuit of FIG. 10. The electrode bar 97 is located along the edge of a transparent substrate 135 and the individual sensing elements 10' are shown connected to the bar 97 which in turn, is connected by bar 96 to one output lead of shift register 92. While only seven sensing elements are illustrated, it is understood that 10 more sensing elements are connected to the bar 97 to complete a 17 element group of sensing elements 10 and that each element receives reflected light from a surface on which substrate 135 rests. The layer of insulation 136 separates all of the bars 132 from the bars 100 except that the insulation at the end of each bar 132 contains an opening for a connection 137 which could be connected through a thin film diode from a bar 132 up through the insulation to the bar 100. Thus, all of the sensing elements except one in a group are electrically insulated from all of the conductor bars 100 and the sensing elements 10' can be placed along a line which is to be sequentially scanned. It is understood that the step shift registers, the commutators, and the clock are all of well known design and require no further explanation.

The single line scan is primarily useful for facsimile transmission where the scanned information is simply duplicated at the receiving end. For instance, the system can be used to transmit words and pictures over telephone lines for reconstruction at some other point. On the other hand, the matrix character scan of FIG. 6 is more useful as a computer input since it can transmit a character signal to the computer. The present invention makes possible contact reading without the use of lenses or optical systems and this results because of the use of semitransparent photoconductors through which the light is transmitted to the page. The sensing and commutating elements can be vapor deposited as very thin films so that the sensing head and readout commutator can be deposited on a single supporting substrate which could also carry the recognition logic for character recognition when such is utilized. The output signals of the matrix character scan would be compatible with the logic which compares them with stored patterns to provide a binary output which is representative of the character. Since stored matrix patterns are well known in the art, the unit 64 is considered typical of such devices. Instead of utilizing a semitransparent photoconductor, an opaque conductor having holes therethrough could be utilized to transmit light to the page to be reflected back to the photoconductor. In this way, the total illumination of the photoconductor will also vary with the printing on the page. The examples of materials for the various components of the sensing elements are by way of examples only.

While the invention has been described in connection with reading out printed material, it can be used to reproduce any pattern which has a varying light reflectivity. Also, the number of sensing elements in a sensing head can be varied as desired, from one on up. For instance, a single sensing element can be used to obtain a measure of the reflectivity of a surface area on an object.

We claim:

1. A scanner for reading matter of varying light reflectively on a surface comprising:

a sensing head comprising a plurality of sensing elements arranged in a predetermined pattern and adapted to be located close to said matter on said surface;

each of said sensing elements comprising a partially light transparent photoconductor;

means for illuminating said photoconductors at the side opposite to said matter for transmitting light through said photoconductors and reflecting light back from said matter to said photoconductors, the quantity of reflected light varying with the reflectivity of the matter at the locations opposite said photoconductors; and means for sequentially scanning the output signal from each of said photoconductors to determine the amount of light reflected back to each of said photoconductors and thereby obtain a representation of the matter opposite said elements.

2. A scanner as defined in claim 1 wherein each of said photoconductors comprises a continuous layer of partially transparent solid state material.

3. A scanner as defined in claim 1 wherein each of said photoconductors comprises a layer of solid state material having openings therein for passage of light therethrough.

2. A scanner as defined in claim 1 wherein each of said photoconductors comprises a continuous layer of partially transparent sol solid state material.

4. A scanner as defined in claim 1 wherein said illuminating means comprises a layer of electroluminescent material, and conductor layers on opposite sides thereof to energize said material.

5. A scanner as defined in claim 1 wherein said scanning means comprises:

conductor means connected with each of said photoconductors;

means for sequentially energizing said conductor means; and means for measuring the photoconductor current in each conductor means to obtain said output signal of each of said elements.

6. A scanner as defined in claim 1 having:

a reference sensing element comprising a partially transparent photoconductor located opposite a plain portion of said surface;

means for illuminating said reference sensing element at the side opposite said surface; and means for comparing the output signal of each of said plurality of sensing elements with the output signal of said reference element to determine the light reflected to each of said plurality of elements.

7. A scanner as defined in claim 6 wherein said scanning means comprises:

conductor means connected with the photoconductors of said reference sensing element and of said plurality of sensing elements;

means for energizing said conductor means for said reference element and for sequentially energizing said conductor means for said plurality of element;

means for sensing the photocurrent in each of said conductor means to obtain an output signal from each of said plurality of elements and from said reference element; and means connected with said output signals for obtaining the difference in photoconductor current between each of said plurality of elements and said reference element.

8. A scanner as defined in claim 7 wherein said sequential energizing means comprises circuit means for each of said plurality of elements responsive to a pulse in a train of pulses.

9. A scanner as defined in claim 1 wherein said elements are arranged in a line extending across said surface.

10. A scanner as defined in claim 9 wherein a number of said sensing elements are connected to a common output line containing a common load resistor.

11. A scanner as defined in claim 1 wherein said elements are arranged in a number of vertical columns of a height corresponding to a pattern height of said matter on said surface, said columns being spaced apart in a line across said surface in order to scan a line of said pattern.

12. A scanner as defined in claim 11 wherein said scanning means simultaneously obtains the output signal from all the elements in a single column.

13. A scanner as defined in claim 12 wherein a number of sensing elements in different columns are connected to a common output line containing a common load resistor.

14. A scanner as defined in claim 11 having a storage matrix for receiving the output signals from said elements and reproducing said pattern by comparing said output signal with the stored arrays of said matrix.

15. A scanner as defined in claim 1 having means for producing a reference output signal for comparison with the output signal of each of said sensing elements.

16. A scanner as defined in claim 9 wherein said line of elements are divided into groups, said scanning means sequentially reading the output of said elements in each group and sequentially switching from one group to the next group.

17. A scanner as defined in claim 16 wherein said elements of each group are connected together by a single connecter said scanning means comprising commutator means connected separately to the elements in each group by individual connecter lines, and element leads connecting one element to one connecter line.

18. A scanner as defined in claim 17 having a continuous sheet of insulation between said connecting lines and said element leads with openings in said sheet for connecting the end of each element lead to a different connecter line.

19. A sensing element for determining the light reflectivity of a portion of a surface comprising:

a partially light transparent photoconductor;

means for illuminating said photoconductor at its side opposite said surface for transmitting light through said photoconductor and reflecting light back from said surface to said photoconductor, the quantity of reflected light varying with reflectivity of the portion of said surface; and means for sensing the output signal of said photoconductor to obtain a measure of the reflectivity of said surface portion.

20. A sensing element as defined in claim 19 wherein said photoconductor comprises a continuous layer of partially transparent solid state material.

21. A sensing element as defined in claim 19 wherein said photoconductor comprises a layer of solid state material having openings therein for passage of light therethrough.

22. A scanning element as defined in claim 19 wherein said illuminating means comprises a layer of electroluminescent material, and conductor layers on opposite sides thereof to energize said material.

23. A sensing element as defined in claim 19 having transparent conductor layers on opposite sides of said photoconductor to energize said photoconductor.

24. A sensing element as defined in claim 23 having a layer of glass located between said surface portion and said conductor layer nearest said surface portion.

25. A sensing element as defined in claim 23 having a layer of glass located between said illuminating means and said conductor layer nearest said illuminating means.

26. A sensing element as defined in claim 19 having means for producing a reference output signal for comparison with the output signal of said element.

27. A sensing element as defined in claim 23 having means connected with said conductor means for placing a voltage across said photoconductor, said measuring means comprising means for obtaining a measure of current flow through said photoconductor.